United States Patent [19]

Lewis

[11] Patent Number: 4,666,680
[45] Date of Patent: May 19, 1987

[54] AUTOTHERMAL PRODUCTION OF SYNTHESIS GAS

[75] Inventor: Jerry L. Lewis, Santa Ana, Calif.

[73] Assignee: Fluor Corporation, Irvine, Calif.

[21] Appl. No.: 574,921

[22] Filed: Jan. 30, 1984

[51] Int. Cl.[4] .......................... B01J 8/06; C01B 3/02; C01C 1/04

[52] U.S. Cl. .................................. 422/191; 252/373; 422/148; 422/193; 422/196; 422/197; 423/360; 423/361

[58] Field of Search ............... 422/148, 197, 312, 193, 422/191; 423/360–362; 518/706, 715; 252/373

[56] References Cited

U.S. PATENT DOCUMENTS

| | | | |
|---|---|---|---|
| 1,544,373 | 6/1925 | Claude | 422/148 X |
| 2,472,254 | 6/1949 | Johnson | 422/193 X |
| 2,887,365 | 5/1959 | De Rycker et al. | 423/360 X |
| 3,442,613 | 5/1969 | Grotz | 422/148 |
| 3,477,828 | 11/1969 | Schulze et al. | 422/148 |
| 3,516,800 | 6/1970 | Yamamoto et al. | 422/148 |
| 4,079,017 | 3/1978 | Crawford et al. | 422/189 X |
| 4,221,763 | 9/1980 | Greene | 422/197 |

FOREIGN PATENT DOCUMENTS

| | | |
|---|---|---|
| 948421 | 2/1964 | United Kingdom . |
| 1093943 | 12/1967 | United Kingdom . |
| 1306417 | 6/1969 | United Kingdom . |
| 1247338 | 9/1971 | United Kingdom . |
| 1257680 | 12/1971 | United Kingdom . |
| 1476155 | 6/1977 | United Kingdom . |

Primary Examiner—David L. Lacey
Assistant Examiner—William R. Johnson
Attorney, Agent, or Firm—Lyon & Lyon

[57] ABSTRACT

A process and apparatus for the auto-thermal production of hydrogen rich synthesis gas wherein a mixture of steam and a hydrocarbon feed gas is reacted by passing through a catalyst counter-currently to the flow of the combustion reaction effluent of the process. Reaction tubes are mounted within a heat exchange chamber of the reactor and are adapted to contain catalyst to effect the reaction of the mixture. Oxygen or oxygen-enriched air is introduced into a combustion chamber within the reactor to effect combustion, and the combustion reaction effluent is passed through a second catalyst zone to provide additional reaction and is thereafter passed about the exterior of the reaction tubes to effect heat exchange with the mixture passing through the tubes. The exothermic heat of reaction from combustion thus provides the heat for the endothermic reaction occurring within the reaction tubes and within the second catalyst zone.

4 Claims, 1 Drawing Figure

U.S. Patent    May 19, 1987    4,666,680
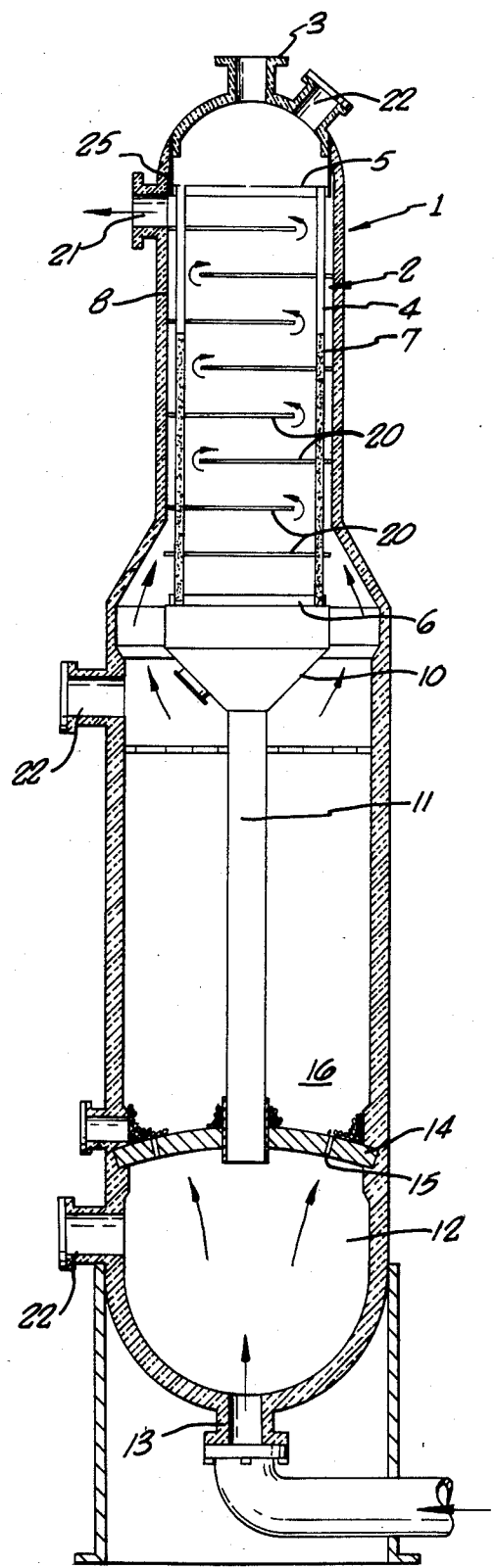

AUTOTHERMAL PRODUCTION OF SYNTHESIS GAS

BACKGROUND OF THE INVENTION

The present invention relates to a process and an apparatus for producing a hydrogen-rich synthesis gas, for example, an ammonia synthesis gas.

The process for producing ammonia from a hydrocarbon feed stream, such as natural gas, is, of course, well known. Thus, a mixture of the hydrocarbon feed gas and water in the form of steam is subjected to an endothermic catalytic reaction to yield carbon monoxide and hydrogen. This reaction is commonly referred to as primary reforming. It is then necessary to introduce nitrogen, which is typically done in the form of air, to produce the requisite ammonia synthesis gas by what is referred to as secondary reforming.

In prior commercial ammonia processes, the primary and secondary reforming steps have typically been carried out in separate reactors, and such process is quite suitable and satisfactory in plant situations where it is necessary or desirable to produce steam for other uses within the plant. Thus, in such processes, the hot reaction effluent from the secondary reforming operation is used to generate and/or to superheat steam, either for use otherwise within the ammonia process or for export.

In situations where the production of steam is not necessary, it is accordingly advantageous to utilize the heat available from the secondary reforming step for other purposes within the synthesis gas production process. One such use of the available heat from secondary reforming is to provide the heat necessary for primary reforming. The provision of a process and apparatus to achieve such use at a high level of efficiency is accordingly a principal objective of the present invention.

The production of ammonia, as well as other products such as methanol which are derived from hydrocarbons, has evolved in the last several years into a sophisticated state-of-the-art technology, in which cost effective improvements are essential but are exceptionally difficult to accomplish. In view of this, it is quite desirable to be able to achieve both primary reforming and secondary reforming in a single reactor, so that the overall cost of the production process can be reduced by elimination of expensive reactors and associated non-essential equipment.

There have been prior efforts to provide satisfactorily such reactors, but certain significant shortcomings have been encountered. For example, U.S. Pat. No. 3,751,228 describes a reactor in which the hot reformed gaseous product is removed from the bottom of the reactor, rather than utilized to provide heat for the reforming reaction. Instead, hot gas is introduced from outside the reactor to provide the necessary heat for the reforming step. A similar reactor is described in U.S. Pat. No. 4,127,289.

U.S. Pat. No. 4,071,330 describes a reactor which is positioned within a fired furnace and utilizes heat transfer from the furnace across the shell of the reactor, to provide the requisite heat for the endothermic reforming reaction. The shell is formed of a heat conducting material such as high nickel-chrome steel.

In U.S. Pat. No. 3,549,335, an autothermal reactor is illustrated and described, which includes an outer shell with an inner shell spaced therefrom to provide an annular passageway through which the hydrocarbon and steam mixture passes, through openings in the inner shell at the lower section of the reactor and through the primary reforming catalyst bed positioned outside of the tubes. The gas is thereafter brought into contact with the combustion reaction product and ultimately removed from the reactor. Such reaction process, utilizing atmospheric air for the combustion step, does not provide efficient utilization of the exothermic heat of reaction, as is highly desirable in today's sophisticated and competitive state of the art.

SUMMARY OF THE INVENTION

As indicated by the foregoing, it is an objective of the present invention to provide an improved process and apparatus for autothermal production of a hydrogen-rich synthesis gas such as an ammonia synthesis gas in which efficient utilization is made of the exothermic heat of reaction within the synthesis gas production process.

In the process and apparatus of the present invention, a mixture of steam and hydrocarbon feed gas is subjected to primary reforming by passing through a catalyst countercurrently to the flow of the combustion reaction effluent of the process. The mixture is passed through reaction tubes which contain primary reforming catalyst and is thereafter brought into contact with oxygen or oxygen enriched air to effect combustion. The combustion reaction effluent is passed through a second catalyst zone to provide additional reaction, that is, the secondary reforming reaction, and to produce the synthesis gas. The synthesis gas product is passed about the exterior of the reaction tubes, thus utilizing the exothermic heat of combustion to provide the heat for the endothermic primary and secondary reaction steps.

BRIEF DESCRIPTION OF THE DRAWING

The single FIGURE of drawing is a section view of a preferred embodiment of the autothermal reactor of this invention.

DESCRIPTION OF THE PREFERRED EMBODIMENTS

Referring now to the FIGURE of Drawing, the autothermal reactor is designated generally by the numeral 1. The reactor comprises a heat exchange chamber 2 and a first inlet 3 for introduction of a mixture of steam and hydrocarbon feed gas, such as natural gas. A plurality of reaction tubes 4 (only two are illustrated for purposes of clarity) are mounted within the heat exchange chamber in tube plates 5 and 6. The reaction tubes are designed such that a fixed bed primary catalyst 7 may be positioned therein. The catalyst, of course, may be any suitable reforming catalyst, such as nickel, with the choice of a particular catalyst being well within the skill of the art.

Means shown as a cone shaped collector 10 with a vertically extending tube 11 are positioned in communication with the reaction tubes adjacent tube plate 6 to provide for passage of the reacted partially reformed gases from the reaction tubes to a combustion reaction chamber 12 which is provided at the bottom portion of the reactor 1. While the configuration of collector 10 is illustrated as a cone, it will be readily understood that other configurations may also be used.

A second inlet 13 is provided at the bottom of the reactor to introduce oxygen or oxygen-enriched air to effect combustion within the combustion chamber. A partition 14 is provided adjacent the end of vertically extending tube 11 to separate combustion chamber 12 from heat exchange chamber 2. Means are provided in the form of a plurality of openings 15 in partition 14 so that the combustion reaction effluent may pass therethrough and enter a second catalyst zone, designated generally by numeral 16, whereby the effluent may pass through the catalyst zone and undergo additional or secondary reforming to produce the desired synthesis gas. Again, the reforming catalyst will be any of those typically used, and is a matter well within the ability of those skilled in the art to select. Also, for purposes of clarity of illustration, only a relatively small proportion of catalyst is shown, but it will be understood that sufficient catalyst will be provided to achieve an entire zone of catalyst.

As the synthesis gas thus produced passes upwardly from the second catalyst zone, it is directed by means of flow baffles 20 about the exterior of the reaction tubes 4 to provide intimate contact between the reaction tubes and the hot effluent. This in turn permits efficient utilization of the exothermic heat of combustion to provide the heat for the endothermic reaction occurring within the reaction tubes 4.

An outlet 21 is also provided approximately adjacent inlet 3, through which the synthesis gas is removed for purification and further processing to produce ammonia (or other product, depending upon the particular reaction process). The reactor is illustrated as including manways 22, as is conventional, to provide for servicing or other maintenance. The reactor could also be provided with additional inlets and outlets, if desire, for flow distribution or for the introduction of additional fuel gas or steam to the combustion chamber.

In effecting the conversion process of this invention as applied to ammonia synthesis production, the mixture of steam and natural gas or other hydrocarbon feed gas is brought into reactor 1 through inlet 3 at a temperature of approximately 900° to 1300° F. The mixture passes through the openings in tube sheet 5 and through reaction tubes 4, exiting from the reaction tubes through the cone-shaped collector 10 and passing through tube 11 and exiting into the lower part of reactor 1 and into the combustion chamber 12 at a temperature of approximately 1100° to 1400° F. Oxygen or oxygen enriched air at a temperature ranging from ambient to approximately 1000° F. is introduced into the combustion chamber through inlet 13 to effect combustion. The resulting combustion reaction effluent is thus at a temperature of approximately 2500°–3500° F. and passes upwardly through openings 15 in partition 14, and through the second catalyst zone 16, whereby the secondary reforming operation occurs.

The synthesis gas mixture thus produced by the secondary reforming is at a temperature of approximately 1500°–2100° F. and flows upwardly, as illustrated and described above, into intimate contact with the reaction tubes 4, whereby the desired heat exchange takes place to heat the steam and hydrocarbon feed gas mixture within tubes 4 and to cool the synthesis gas mixture. Upon exiting outlet 21, the temperature of the synthesis gas mixture is approximately 1000°–1300° F.

The pressure within the reactor may range from essentially atmospheric up to the synthesis gas conversion pressure, which with today's technology is approximately 1200 psig, depending upon the applicable process conditions. A typical pressure for the production of ammonia synthesis gas is about 700 psig.

It will be appreciated from the foregoing description that the process and reactor of this invention can be utilized for the production of synthesis gases to produce products other than ammonia, such as methanol, hydrogen, oxo-alcohol, or a hydrocarbon by Fischer-Tropsch. Inasmuch as the central process steps are the same as those described for ammonia synthesis gas production, the process of the present invention will not again be described with respect to such synthesis gases.

It is significant to the successful operation of the process of this invention that oxygen or oxygen-enriched air be introduced into the combustion chamber, instead of atmospheric air, to effect combustion. By oxygen-enriched air, it is intended to define an air mixture containing an oxygen content of approximately 25% or greater by volume. The oxygen content may vary from such lower limit up to 100%, depending upon the specific reaction process. Thus, with ammonia synthesis gas production, the $O_2$ content may vary from approximately 25% to about 40% or more, with approximately 35% by volume being optimum for most ammonia synthesis gas process conditions. In methanol production, on the other hand, essentially 100% oxygen will be used. In any event, those skilled in the art, given the disclosure here, will be able to determine appropriate proportions and whether oxygen or oxygen-enriched air should be used.

The use of oxygen-enriched air instead of atmospheric air provides a number of important advantages. Thus, better control of the nitrogen content of the combustion effluent is achieved due to the ability to control the ratio of oxygen to nitrogen in the mixture. Control of the nitrogen content is extremely important to the process of this invention, because nitrogen tends to carry out heat from the reactor, thereby decreasing the high level heat that is otherwise available from the combustion reaction for process use. By controlling the nitrogen content, therefore, the present process avoids unnecessary loss of available heat and enables the highest level of available heat to be matched with the highest level of use, within the process.

As those skilled in the art will appreciate, steam could also be introduced into the combustion chamber with the oxygen-enriched air. This would enable the introduction of additional steam reactant to compensate for the depletion resulting from the primary reforming reaction. It would also facilitate control of the combustion temperature and enhance operation of upstream oxygen-enriched air preheating equipment.

It will also be apparent to those skilled in the art that the process and apparatus of the present invention have significant additional advantages over prior processes and reactors. Thus, the capital cost necessary for the present reactor is significantly lower than for standard fired reformers. Additionally, the present invention is readily susceptible to use with high pressure reforming, and is very suitable for modularization, which is of paramount importance in developing countries or in the utilization of off-shore associated gas. Furthermore, start-up time can be reduced, which results in turn in a savings in gas usage, and the reformer time on stand-by, with inefficient gas use when the synthesis unit is down, can also be reduced. The present invention is also more amenable to automatic start-up and control than multiple pass, multiple burner fired primary reformers currently in use.

It should also be mentioned that although the autothermal reactor illustrated and described herein is a vertically disposed reactor with the heat exchange chamber positioned above the secondary reformer catalyst bed and combustion chamber, other physical arrangement for such reactor will become apparent to those skilled in the art, given a reading of the present disclosure. Similarly, although a preferred form of the invention utilizes reaction tubes with catalyst therein as illustrated and described, it would be within the skill of the art, given the disclosure herein, to modify the flow path within the reactor so that the gaseous product exiting the second or secondary reforming catalyst zone would pass through the tubes and the incoming steam-feed gas mixture would pass through a catalyst bed outside of the tubes. Such embodiments, of course, are intended to be included within the scope of the present invention, as long as the essential features and principles described above are present.

It should also be mentioned that the shell or wall of reactor 1 is insulated internally, as shown at 8, with a material such as reinforcing ceramic to minimize heat transfer across the shell. This results in conservation of heat, the protection of personnel in the vicinity of the reactor, and also in a lower capital cost since a material such as carbon steel can be used for the shell. Additionally, the reaction tubes 4, within tubes plates 5 and 6, are hung or suspended within the reactor from the wall thereof as illustrated in 25. This allows the use of thin wall tubes, which are less expensive and have better heat transfer characteristics than thicker tubes; since thin wall tubes have more strength in tension than compression, they are mounted within the reactor vessel by suspension, as otherwise the tubes could deform or even collapse.

What is claimed is:

1. An autothermal reactor for the production of a synthesis gas in which both primary reforming and secondary reforming are achieved at a high level of efficiency, comprising a heat exchange chamber having a first portion and a second portion, a first inlet connected to said heat exchange chamber for the introduction of steam and feed gas to said heat exchange chamber, a plurality of reaction tubes mounted within the first portion of said heat exchanger chamber at a location spaced longitudinally from said first inlet in communication with said first inlet and in non-concentric relationship therewith so as to provide a flow path for the steam and feed gas from said first inlet through said plurality of reaction tubes, each of said plurality of reaction tubes containing catalyst therein to effect a first reforming reaction and being located in relation to said first inlet such that the flow of steam and feed gas introduced through said first inlet will be distributed amongst said plurality of reaction tubes, a combustion reaction chamber, means communicating with said reaction tubes to pass the thus reacted gases from said tubes to said combustion reaction chamber, said means extending longitudinally from said reaction tubes and extending generally into said combustion reaction chamber, a second inlet connected to said combustion reaction chamber so as to introduce oxygen or oxygen enriched air into said combustion reaction chamber, said second inlet being in non-concentric relationship with said combustion reaction chamber, means defining a second catalyst zone located in the second portion of said heat exchange chamber, a partition separating said heat exchange chamber from said combustion reaction chamber, said partition including means to permit the passage of combustion reaction effluent therethrough to said second catalyst zone, wherein said second catalyst zone comprises a catalyst bed supported on said partition to effect a second reforming reaction, whereby the combustion reaction effluent can pass through said partition and said second catalyst zone to undergo additional reforming reaction and to produce synthesis gas, an outlet for removal of synthesis gas positioned in said reactor approximately adjacent said first inlet and in non-concentric relationship with said first inlet and with said reaction tubes so that the synthesis gas passes about the outside of said reaction tubes prior to removal through said outlet which provides heat for said first reforming reaction within said reaction tubes and cools the synthesis gas.

2. The reactor of claim 1 further comprises flow baffles which are positioned within the first portion of said heat-exchange chamber to direct the flow of combustion reaction effluent about said reaction tubes.

3. The reactor of claim 1 in which said means communicating with said reaction tubes is a collector positioned adjacent the outlet end of said reaction tubes with a pipe extending vertically downward therefrom through said partition and into said combustion chamber.

4. The reactor of claim 1 further comprising suspension means for attaching said plurality of reaction tubes to said reactor.

* * * * *